US012753814B2

(12) United States Patent
Fujimoto et al.

(10) Patent No.: US 12,753,814 B2
(45) Date of Patent: Oct. 6, 2026

(54) DISC BRAKE DEVICE FOR RAILWAY VEHICLE

(71) Applicant: NIPPON STEEL CORPORATION, Tokyo (JP)

(72) Inventors: Takahiro Fujimoto, Tokyo (JP); Yuiko Shiotani, Tokyo (JP); Takanori Kato, Tokyo (JP); Hiroshi Nogami, Tokyo (JP); Yuki Ichikawa, Tokyo (JP); Naruo Miyabe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 435 days.

(21) Appl. No.: 18/554,045

(22) PCT Filed: May 14, 2021

(86) PCT No.: PCT/JP2021/018490

§ 371 (c)(1), (2) Date: Oct. 5, 2023

(87) PCT Pub. No.: WO2022/239247

PCT Pub. Date: Nov. 17, 2022

(65) Prior Publication Data

US 2024/0183415 A1 Jun. 6, 2024

(51) Int. Cl.

*F16D 65/12* (2006.01)
*B60B 27/00* (2006.01)
*F16D 65/00* (2006.01)

(52) U.S. Cl.

CPC ........ *F16D 65/124* (2013.01); *B60B 27/0052* (2013.01); *F16D 65/128* (2013.01);

(Continued)

(58) Field of Classification Search

CPC .. F16D 65/124; F16D 65/128; F16D 65/0006; B60B 27/0052; B60B 2900/133; B60B 2900/513

See application file for complete search history.

(56) References Cited

U.S. PATENT DOCUMENTS

| | | | | |
|---|---|---|---|---|
| 2015/0247541 A1* | 9/2015 | Nogami | F16D 65/847 188/218 XL | |
| 2021/0025465 A1 | 1/2021 | Kondo et al. | | |

(Continued)

FOREIGN PATENT DOCUMENTS

| | | | | |
|---|---|---|---|---|
| ES | 2929459 T3 * | 11/2022 | F16F 15/12 | |
| JP | 2007032609 A | 2/2007 | | |

(Continued)

*Primary Examiner* — Vishal R Sahni

(74) *Attorney, Agent, or Firm* — Greer Burns & Crain Ltd.

(57) ABSTRACT

A disc brake device includes a rotary member, a brake disc, a control member, and a fastening member. The brake disc includes a disc body having an annular shape and a plurality of fins. The control member includes a base plate and a protruding portion, and controls an airflow rate between the fins disposed adjacent to each other. At least one of the fins has a fastening hole including a small diameter portion. The base plate has a through hole. A shaft portion of the fastening member is inserted through the small diameter portion and the through hole. A peripheral edge of the through hole is disposed on an outer circumferential side of a peripheral edge of the small diameter portion.

6 Claims, 6 Drawing Sheets

(52) U.S. Cl.
CPC ... *B60B 2900/133* (2013.01); *B60B 2900/513* (2013.01); *F16D 65/0006* (2013.01)

(56) References Cited

U.S. PATENT DOCUMENTS

| | | | | |
|---|---|---|---|---|
| 2021/0396287 | A1* | 12/2021 | Kato | F16D 65/124 |
| 2021/0396288 | A1* | 12/2021 | Boffelli | F16D 65/124 |
| 2022/0333656 | A1* | 10/2022 | Nogami | F16D 65/847 |

FOREIGN PATENT DOCUMENTS

| | | | |
|---|---|---|---|
| JP | 2007205428 | A | 8/2007 |
| WO | 2019194203 | A1 | 10/2019 |

* cited by examiner

DISC BRAKE DEVICE FOR RAILWAY VEHICLE

TECHNICAL FIELD

The present disclosure relates to a disc brake device for a railway vehicle.

BACKGROUND ART

A disc brake device has been widely used as a braking device for a railway vehicle. The disc brake device includes a brake disc having an annular shape and a brake lining. The brake disc is fastened to a wheel, for example, and rotate together with the wheel. The brake lining is pushed against the brake disc. The brake disc and the wheel are braked by friction between the brake lining and the brake disc.

The brake disc of a disc brake device used for a railway vehicle is required to have sufficient cooling performance from the viewpoint of ensuring durability of the brake disc. To ensure cooling performance during braking, in general, a plurality of fins are formed on the rear surface of the brake disc in a radial shape. Each fin is brought into contact with the wheel, thus forming a ventilation passage between the rear surface of the brake disc and the wheel. The ventilation passage allows air to pass therethrough from the inner side to the outer side in the radial direction of the brake disc when the brake disc rotates together with the wheel. The brake disc is cooled by the air flowing through the ventilation passage.

However, air flows through the ventilation passage formed between the brake disc and the wheel during traveling of the railway vehicle, so that aerodynamic sound is generated. Particularly, when the railway vehicle travels at a high speed, the airflow rate in the ventilation passage increases, so that a large aerodynamic sound is generated.

In view of the above, Patent Literature 1 discloses a disc brake device in which fins disposed adjacent to each other in the circumferential direction are connected with each other by connecting portions. In this disc brake device, due to the provision of the connecting portions, a portion having the minimum cross-sectional area is formed in each of ventilation passages formed between the fins. According to Patent Literature 1, by setting the sum of the minimum cross-sectional areas of the ventilation passages to 18000 $mm^2$ or less, it is possible to reduce aerodynamic sound during traveling at a high speed.

In Patent Literature 1, the connecting portions provided for reducing aerodynamic sound are integrally formed with the disc body and the fins of the brake disc. Therefore, in the brake disc, rigidity of portions in the vicinity of the connecting portions is larger than rigidity of other portions. For this reason, when a brake lining slides with respect to the brake disc during braking, thus generating frictional heat, the portions in the vicinity of the connecting portions are less likely to have heat deformation compared with other portions, so that warpage occurs in the brake disc. As a result, a load on the fastening member, which fastens the brake disc to the wheel, increases.

In view of the above, Patent Literature 2 proposes a technique in which an aerodynamic sound reducing member (control member), which is a separate body from a brake disc, is provided to a disc brake device. According to Patent Literature 2, a protruding portion provided to the control member closes a portion of a ventilation passage, so that the flow of air through the ventilation passage is suppressed and hence, it is possible to reduce aerodynamic sound generated during traveling of the railway vehicle. Further, the brake disc and the control member are separate parts and hence, the protruding portion of the control member does not affect rigidity of the brake disc.

CITATION LIST

Patent Literature

Patent Literature 1: Japanese Patent Application Publication No. 2007-205428

Patent Literature 2: International Application Publication No. WO2019/194203

SUMMARY OF INVENTION

Technical Problem

In the disc brake device disclosed in Patent Literature 2, the control member is disposed between the rotary member, such as a wheel, and the brake disc, and is fastened to the rotary member together with the brake disc with the fastening member. The shaft portion of the fastening member extends from the brake disc to the rotary member through a through hole provided in the control member. In braking the rotary member with this disc brake device, heat deformation occurs in the brake disc due to frictional heat generated between the brake disc and the brake lining. The brake disc first thermally expands outward (toward the brake lining) in the axial direction and, after the lapse of a certain time from the start of braking, also thermally expands outward in the radial direction. In contrast, the control member is away from the sliding portion between the brake disc and the brake lining, thus having almost no heat deformation. Therefore, when the brake disc thermally expands, and the fastening member moves with the thermal expansion of the brake disc, the shaft portion of the fastening member interferes with the peripheral edge of the through hole in the control member, so that there is a possibility that an excessive load is applied to the control member.

An objective of the present disclosure is to reduce, in the disc brake device for a railway vehicle, in which the control member that controls the airflow rate in a ventilation passage is provided, a load on the control member.

Solution to Problem

A disc brake device according to the present disclosure is a disc brake device for a railway vehicle. The disc brake device includes a rotary member, a brake disc, a control member, and a fastening member. The rotary member is to be attached to an axle of the railway vehicle. The brake disc includes a disc body having an annular shape and a plurality of fins. The disc body has a rear surface that faces the rotary member. The fins are disposed on the rear surface in a radial shape. The control member includes a base plate and a protruding portion. The base plate is sandwiched between the rotary member and the fins. The protruding portion protrudes from the base plate toward the disc body, and is positioned between, among the fins, fins disposed adjacent to each other in a circumferential direction of the brake disc. The control member controls an airflow rate between the fins disposed adjacent to each other. The fastening member fastens the brake disc and the control member to the rotary member. At least one of the fins has a first fastening hole. The first fastening hole includes a large diameter portion and a small diameter portion. A head portion of the fastening member is disposed in the large diameter portion. The small diameter portion has a diameter smaller than a diameter of the large diameter portion. A shaft portion of the fastening member is inserted through the small diameter portion. The base plate has a through hole. The through hole is provided in the base plate corresponding to the first fastening hole. The shaft portion of the fastening member is inserted through the through hole. A peripheral edge of the through hole is disposed on an outer circumferential side of a peripheral edge of the small diameter portion of the first fastening hole.

Advantageous Effects of Invention

According to the present disclosure, in a disc brake device for a railway vehicle, in which a control member that controls the airflow rate in a ventilation passage is provided, it is possible to reduce a load on the control member.

DESCRIPTION OF EMBODIMENT

Figure 1:
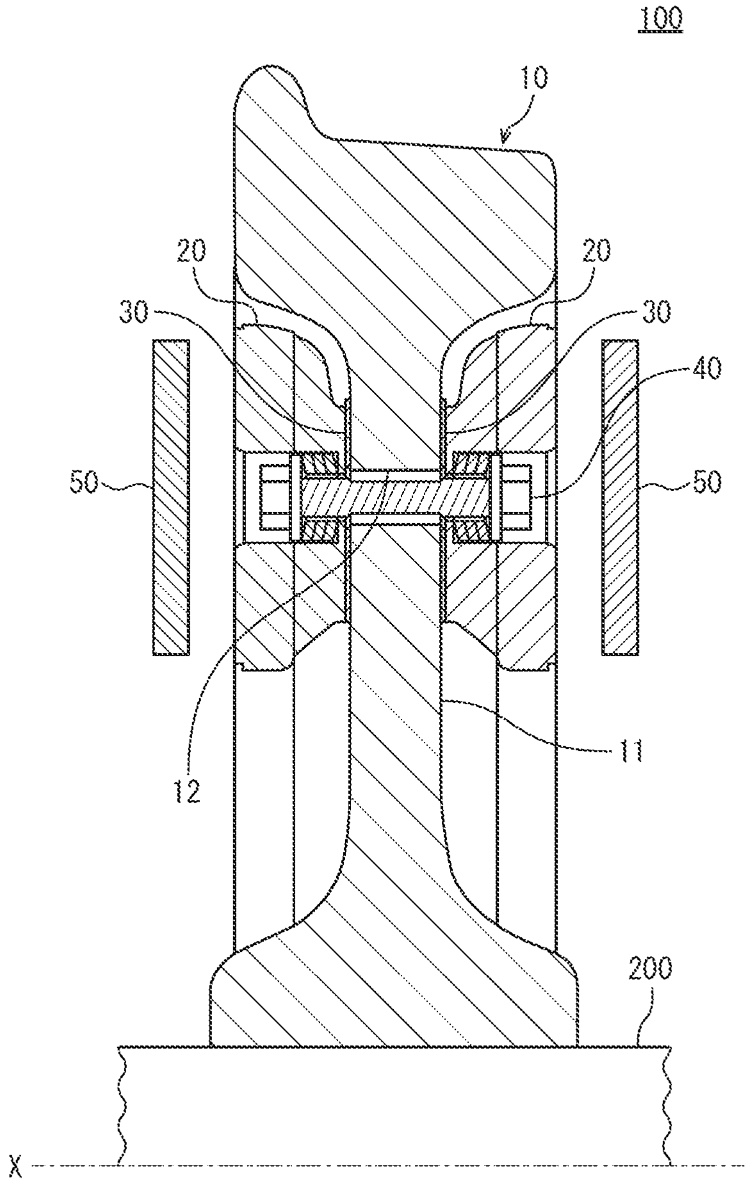
FIG. 1 is a longitudinal cross-sectional view showing a schematic configuration of a disc brake device for a railway vehicle according to an embodiment.

A disc brake device according to an embodiment is a disc brake device for a railway vehicle. The disc brake device includes a rotary member, a brake disc, a control member, and a fastening member. The rotary member is to be attached to an axle of the railway vehicle. The brake disc includes a disc body having an annular shape and a plurality of fins. The disc body has a rear surface that faces the rotary member. The fins are disposed on the rear surface in a radial shape. The control member includes a base plate and a protruding portion. The base plate is sandwiched between the rotary member and the fins. The protruding portion protrudes from the base plate toward the disc body, and is positioned between, among the fins, fins disposed adjacent to each other in a circumferential direction of the brake disc. The control member controls an airflow rate between the fins disposed adjacent to each other. The fastening member fastens the brake disc and the control member to the rotary member. At least one of the fins has a first fastening hole. The first fastening hole includes a large diameter portion and a small diameter portion. A head portion of the fastening member is disposed in the large diameter portion. The small diameter portion has a diameter smaller than a diameter of the large diameter portion. A shaft portion of the fastening member is inserted through the small diameter portion. The base plate has a through hole. The through hole is provided in the base plate corresponding to the first fastening hole. The shaft portion of the fastening member is inserted through the through hole. A peripheral edge of the through hole is disposed on an outer circumferential side of a peripheral edge of the small diameter portion of the first fastening hole (first configuration).

According to the disc brake device according to the first configuration, it is possible to control, by the control member, the airflow rate between the fins disposed adjacent to each other in the circumferential direction on the rear surface of the disc body of the brake disc. That is, in the above-mentioned disc brake device, the protruding portion of the control member is positioned between the fins disposed adjacent to each other and hence, the opening area of the ventilation passage formed by these fins in cooperation with the disc body and the rotary member is partially reduced. With such a configuration, the airflow rate in the ventilation passage can be limited and hence, it is possible to reduce aerodynamic sound generated during traveling of the railway vehicle.

In the first configuration, at least one of the fins provided to the brake disc has the first fastening hole. The first fastening hole includes the small diameter portion through which the shaft portion of the fastening member is inserted. In contrast, the base plate of the control member has the through hole through which the shaft portion of the fastening member is inserted. The peripheral edge of the through hole is disposed on the outer circumferential side of the peripheral edge of the small diameter portion of the first fastening hole. That is, the peripheral edge of the through hole in the control member is disposed farther away from the shaft portion of the fastening member compared with the peripheral edge of the small diameter portion of the first fastening hole in the brake disc. With such a configuration, it is possible to prevent the shaft portion of the fastening member from interfering with the peripheral edge of the through hole in the control member when the fastening member moves with thermal expansion of the brake disc during braking. Accordingly, it is possible to reduce a load on the control member.

The rotary member may have a second fastening hole. The second fastening hole is provided in the rotary member corresponding to the first fastening hole in the brake disc and the through hole in the control member. The shaft portion of the fastening member is inserted through the second fastening hole. The peripheral edge of the through hole is preferably disposed on an outer circumferential side of a peripheral edge of the second fastening hole (second configuration).

According to the second configuration, the peripheral edge of the through hole formed in the base plate of the control member is disposed on the outer circumferential side of the peripheral edge of the second fastening hole formed in the rotary member. Therefore, a portion of the base plate of the control member in the vicinity of the through hole is clamped between the rotary member and the fins. Accordingly, it is possible to suppress a situation in which the portion of the base plate of the control member in the vicinity of the through hole falls into the second fastening hole in the rotary member due to a load or the like in the axial direction from the head portion of the fastening member. That is, it is possible to reduce displacement of the control member in the axial direction.

A distance between the peripheral edge of the through hole and the peripheral edge of the second fastening hole is preferably more than 2.0 mm (third configuration).

According to the third configuration, the peripheral edge of the through hole in the control member is away from the peripheral edge of the second fastening hole in the rotary member by more than 2.0 mm. With such a configuration, it is possible to more surely suppress a situation in which the portion of the base plate of the control member in the vicinity of the through hole falls into the second fastening hole in the rotary member.

A width of the through hole in the circumferential direction of the brake disc is preferably smaller than a maximum width of a top surface of the fin having the first fastening hole (fourth configuration).

According to the fourth configuration, the width of the through hole formed in the base plate of the control member is smaller than the maximum width of the top surface of the fin. With such a configuration, it is possible to prevent occurrence of deformation in which the fin falls into the through hole in the control member.

Hereinafter, an embodiment of the present disclosure will be described with reference to drawings. In respective drawings, identical or corresponding components are given the same reference symbols, and the repeated description will be omitted.

[Overall Configuration]

FIG. 1 is a longitudinal cross-sectional view showing a schematic configuration of a disc brake device 100 for a railway vehicle according to the present embodiment. A longitudinal cross section refers to a cross section of the disc brake device 100 taken along a plane including a center axis X. The center axis X is the axial centerline of an axle 200 of the railway vehicle. Hereinafter, the direction along which the center axis X extends is referred to as "axial direction".

As shown in FIG. 1, the disc brake device 100 includes a rotary member 10, brake discs 20, control members 30, and a fastening member 40.

The rotary member 10 is to be attached to the axle 200, and rotates about the center axis X integrally with the axle 200. In the example of the present embodiment, the rotary member 10 is a wheel of a railway vehicle, and includes a plate portion 11. However, the rotary member 10 may be a disc body other than a wheel. The rotary member 10 has a fastening hole 12 through which the fastening member 40 is caused to pass. The fastening hole 12 penetrates through the rotary member 10 in the axial direction.

The brake discs 20 are provided to both surfaces of the rotary member 10 having a disc shape. Each control member 30 is disposed between the rotary member 10 and each brake disc 20. The brake discs 20 and the control members 30 are fastened to the plate portion 11 of the rotary member 10 with the fastening member 40. The fastening member 40 is typically formed of a bolt and a nut. A brake lining 50 is provided to the outer side of each brake disc 20 in the axial direction.

[Detailed Configuration]

Figure 2:
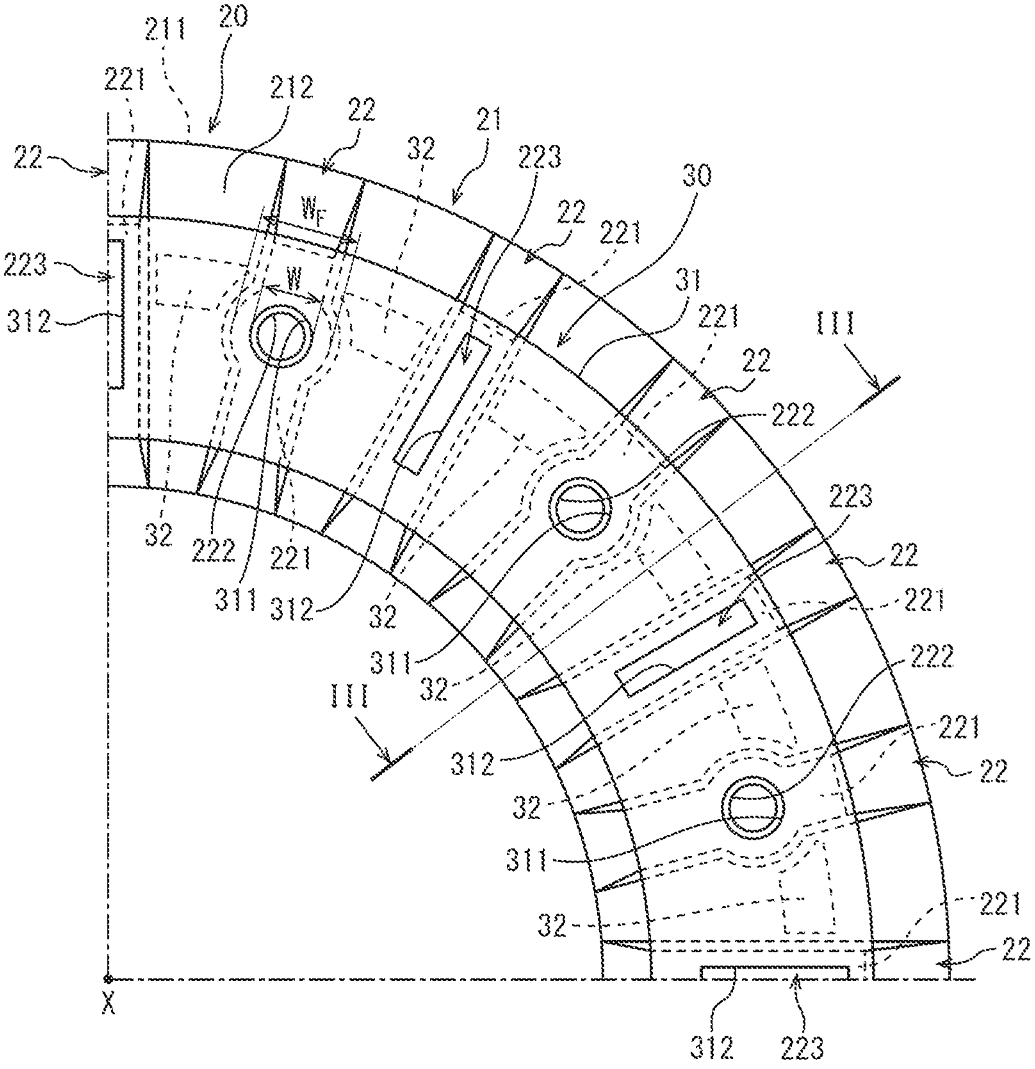
FIG. 2 is a back view of a brake disc and a control member included in the disc brake device shown in FIG. 1.

FIG. 2 is a diagram (back view) of one brake disc 20 and one control member 30 of the brake discs 20 and the control members 30 disposed on both surfaces of the rotary member 10 as viewed from the rotary member 10 side. FIG. 2 shows circumferential quarter portions of the brake disc 20 and the control member 30. Hereinafter, the circumferential direction and the radial direction of the brake disc 20 are simply referred to as the circumferential direction and the radial direction.

Referring to FIG. 2, the brake disc 20 includes a disc body 21 and a plurality of fins 22.

The disc body 21 has an annular shape. The disc body 21 substantially has an annular plate shape that uses the center axis X as the axial centerline. The disc body 21 has a sliding surface 211 and a rear surface 212. The sliding surface 211 is a surface of the disc body 21 on one side in the axial direction. The brake lining 50 (FIG. 1) is pushed against the sliding surface 211 to generate a braking force. The rear surface 212 is a surface of the disc body 21 on the other side in the axial direction, and faces the rotary member 10 (FIG. 1).

The plurality of fins 22 are disposed on the rear surface 212 of the disc body 21 in a radial shape. These fins 22 extend from the inner side to the outer side of the disc body 21 in the radial direction. Each fin 22 protrudes toward the rotary member 10 (FIG. 1) from the rear surface 212. Therefore, spaces are formed between the rotary member 10, fins 22 disposed adjacent to each other in the circumferential direction, and the disc body 21. These spaces form ventilation passages through which air passes when the brake disc 20 rotates together with the rotary member 10.

Among the plurality of fins 22 provided to the disc body 21, some fins 22 have fastening holes 222 through each of which the fastening member 40 (FIG. 1) is caused to pass. Each fastening hole 222 is provided corresponding to the fastening hole 12 (FIG. 1) in the rotary member 10. Each fastening hole 222 penetrates through the disc body 21 and the fin 22. Key grooves 223 having a recessed shape are formed on top surfaces 221 of other fins 22. Keys (not shown in the drawing) that restrict relative rotation between the brake disc 20 and the rotary member 10 (FIG. 1) are fitted in the key grooves 223. The number of fins 22, the number of fastening holes 222, and the number of key grooves 223 may be suitably set. In the example of the present embodiment, the fastening hole 222 or the key groove 223 is formed in each of all fins 22. However, fins 22 having neither fastening hole 222 nor key groove 223 may be present.

As shown in FIG. 2, the control member 30 is a member separated from the brake disc 20. The control member 30 controls the airflow rate between fins 22 disposed adjacent to each other in the circumferential direction. The control member 30 includes a base plate 31 and a plurality of protruding portions 32.

The base plate 31 has a substantially annular plate shape, and is disposed substantially coaxially with the disc body 21. The base plate 31 is sandwiched between the rotary member 10 (FIG. 1) and the plurality of fins 22. That is, the rotary member 10 is brought into contact with one surface of the base plate 31, and the top surfaces 221 of the fins 22 are brought into contact with the other surface of the base plate 31.

In the example of the present embodiment, the length of the base plate 31 in the radial direction is substantially equal to the length of the top surface 221 of the fin 22 in the radial direction. However, the length of the base plate 31 in the radial direction may be longer than the length of the top surface 221 of the fin 22, or may be shorter than the length of the top surface 221 of the fin 22. In the case in which the length of the base plate 31 is shorter than the length of the top surface 221 of the fin 22, recessed portions may be formed on the top surfaces 221 of the fins 22 to accommodate the base plate 31.

To cause the fastening members 40 (FIG. 1) to be inserted through the base plate 31, the base plate 31 has a plurality of through holes 311 formed therein corresponding to the fastening holes 12 (FIG. 1) in the rotary member 10 and the fastening holes 222 in the brake disc 20. To cause the above-described keys (not shown in the drawing) to be inserted through the base plate 31, the base plate 31 also has a plurality of openings 312 corresponding to the key grooves 223 on the brake disc 20.

Each through hole 311 has a width W in the circumferential direction. The width W of the through hole 311 is smaller than a maximum width $W_F$ of the top surface 221 of the fin 22 having the fastening hole 222. The width W is a length of a straight line connecting ends of each through hole 311 in the circumferential direction. The maximum width $W_F$ is the maximum value of the length of a straight line that connects both side edges of the top surface 221 of the fin 22 and that is orthogonal to the radial direction. The top surface 221 of the fin 22 has the maximum width $W_F$ in a region in which the fastening hole 222 is opened, for example.

A difference between the maximum width $W_F$ of the fin and the width W of the through hole 311 is preferably more than 3.0 mm ($W_F$−W>3.0 mm), and is more preferably more than 4.0 mm ($W_F$−W>4.0 mm). Although not particularly limited, the width W of the through hole 311 is, for example, less than 47.0 mm, is preferably less than 44.0 mm, and is more preferably less than 43.0 mm.

The through hole 311 may have any of various shapes. In the example of the present embodiment, each through hole 311 has a circular shape when the control member 30 is viewed in a plan view or in a back view. In the case in which the through hole 311 has a circular shape, the width W of the through hole 311 is the diameter of the through hole 311. However, the through hole 311 may have an oval shape, for example, when the control member 30 is viewed in a plan view or in a back view. In the case in which the through hole 311 has an oval shape having a major axis extending in the radial direction, the width W of the through hole 311 is the minor diameter of the through hole 311. In the case in which the through hole 311 has an oval shape having a minor axis extending in the radial direction, the width W of the through hole 311 is the major diameter of the through hole 311.

The plurality of protruding portions 32 are formed, among both surfaces of the base plate 31, on the surface of the base plate 31 on the brake disc 20 side. The protruding portions 32 are provided at intervals in the circumferential direction. Each protruding portion 32 protrudes from the base plate 31 toward the disc body 21, and is positioned between the fins 22 disposed adjacent to each other in the circumferential direction. That is, one protruding portion 32 is disposed between the fins 22 disposed adjacent to each other in the circumferential direction.

Figure 3:
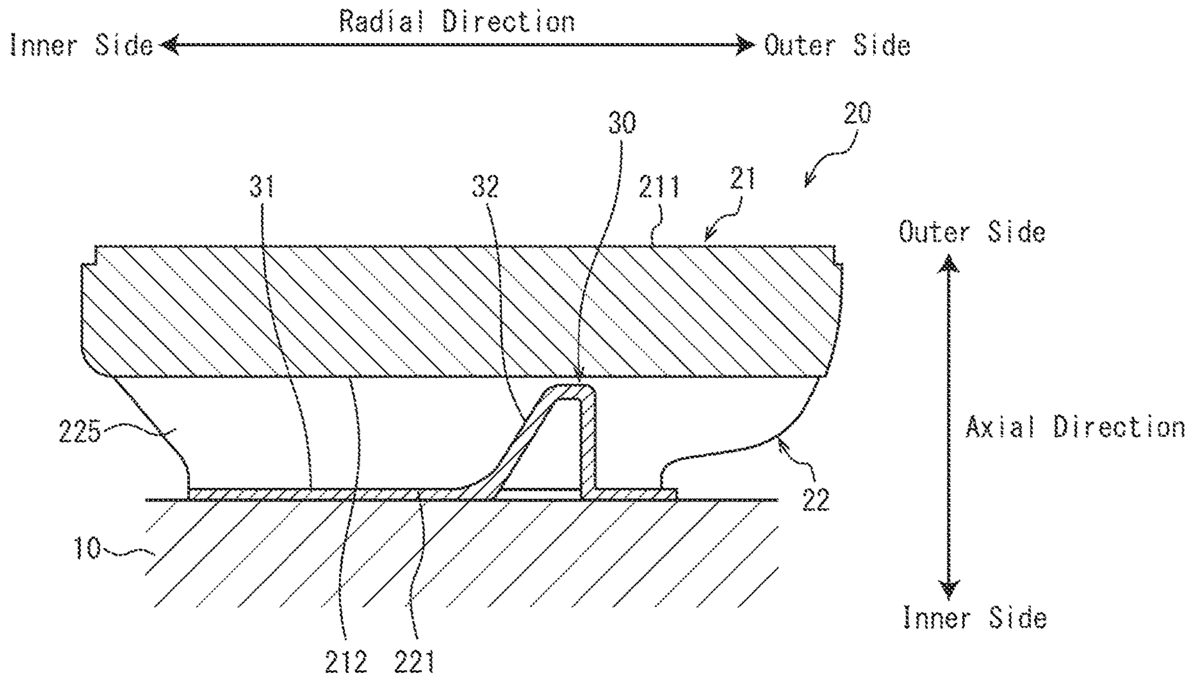
FIG. 3 is a cross-sectional view taken along the line III-III in FIG. 2.

FIG. 3 is a cross-sectional view taken along the line III-III in FIG. 2. As shown in FIG. 3, each protruding portion 32 protrudes from the base plate 31 toward the rear surface 212 of the disc body 21. The distal end of the protruding portion 32 does not come into contact with the rear surface 212 of the disc body 21. Further, both side edges of the protruding portion 32 do not come into contact with side surfaces 225 of the fins 22. Therefore, a space having a substantially U shape is formed between the protruding portion 32 and the brake disc 20 as viewed in the radial direction.

The sum of cross-sectional areas of spaces, each of which is formed between each protruding portion 32 and the brake disc 20 and each of which has a substantially U shape, may be set to, for example, 18000 $mm^2$ or less. The sum of the cross-sectional areas may be set to 2500 $mm^2$ or more, for example. The cross-sectional area of the space having a substantially U shape refers to a minimum area of the cross section of the space, which is formed between each protruding portion 32 and the brake disc 20 and which has a substantially U shape, taken along the circumferential direction. The sum of the cross-sectional areas is the calculation value obtained by adding all cross-sectional areas of the respective spaces in the circumferential direction.

In the present embodiment, the protruding portion 32 has a substantially triangular shape in longitudinal cross section (cross section taken along the radial direction). That is, the radial inner surface of the protruding portion 32 is inclined in such a way as to approach the rear surface 212 of the disc body 21 as the protruding portion 32 goes toward the outer side in the radial direction of the disc body 21. However, the shape of the protruding portion 32 is not particularly limited. The protruding portion 32 may be formed into a hollow shape, or may be formed into a solid shape. From the viewpoint of smoothly guiding air in ventilation passages, it is preferable that the surface of each protruding portion 32 has a smooth shape having no corner portion.

The control member 30 may be made of a metal thin-wall material having a sheet thickness of 1.0 mm to 3.0 mm. The control member 30 is formed by pressing this thin-wall material, for example. In this case, the base plate 31 and the plurality of protruding portions 32 are integrally formed. However, a configuration may be adopted in which the base plate 31 and the protruding portions 32 are formed as separate bodies and, thereafter, the protruding portions 32 are fixed to the base plate 31 by welding or the like.

Figure 4:
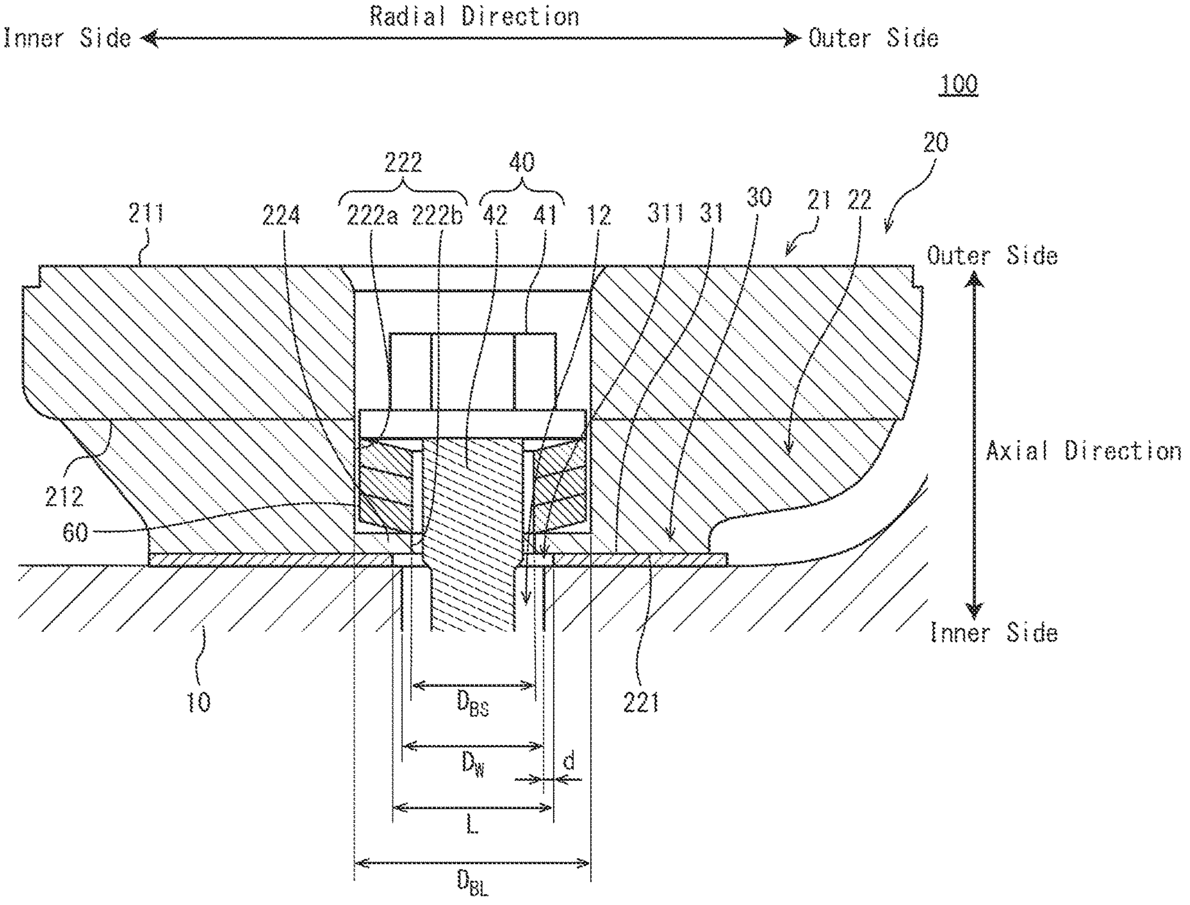
FIG. 4 is a partial enlarged view of the disc brake device shown in FIG. 1.

Hereinafter, the disc brake device 100 including the rotary member 10, the brake disc 20, the control member 30, and the fastening member 40 will be described in more detail with reference to FIG. 4. FIG. 4 is a partial enlarged view of FIG. 1.

As shown in FIG. 4, the brake disc 20 and the control member 30 are fastened to the rotary member 10 with the fastening member 40. The fastening member 40 is inserted into the fastening hole 222 provided in the brake disc 20, the through hole 311 provided in the control member 30, and the fastening hole 12 provided in the rotary member 10.

In the brake disc 20, the fastening hole 222 includes a large diameter portion **222*a* and a small diameter portion 222*b*. The small diameter portion 222*b* forms the end portion of the fastening hole 222 on the side close to the top surface 221 of the fin 22. The small diameter portion 222*b* has a diameter $D_{BS}$ smaller than a diameter $D_{BL}$ of the large diameter portion 222*a*. Due to a difference in diameter between the large diameter portion 222*a* and the small diameter portion 222*b*, a bottom portion 224 having an annular shape is formed on the periphery of the small diameter portion 222*b***.

A head portion 41 of the fastening member 40 is disposed in the large diameter portion **222*a*. The head portion 41 is the head portion of a bolt or a nut. The head portion 41 in the large diameter portion 222*a* is directly or indirectly supported by the bottom portion 224. In the example of the present embodiment, one or more belleville washers 60 are disposed between the head portion 41 and the bottom portion 224. That is, the head portion 41 is supported by the bottom portion 224 via the belleville washers 60. From the viewpoint of ensuring strength, the thickness (the length in the axial direction) of the bottom portion 224 is preferably 1.0 mm or more, and is more preferably 2.0 mm or more. The thickness of the bottom portion 224** is 6.0 mm or less, for example.

A shaft portion 42 of the bolt, which is a part of the fastening member 40, is inserted through the small diameter portion **222*b*. The shaft portion 42 extends in the axial direction from the head portion 41 in the large diameter portion 222*a*, and is inserted through the small diameter portion 222*b*, the through hole 311 in the control member 30, and the fastening hole 12 in the rotary member 10**.

In the control member 30, each through hole 311 provided in the base plate 31 has a minimum diameter length L. The length L is a length of the shortest straight line of straight lines each of which connects two points on the peripheral edge of each through hole 311 and which passes through the center of the through hole 311. In the example of the present embodiment, the through hole 311 has a circular shape and hence, the length L is the diameter of the through hole 311, and is equal to the width W (FIG. 2). In the case in which the through hole 311 has an oval shape, the length L is the minor diameter of the through hole 311.

The length L of the through hole 311 is larger than the diameter $D_{BS}$ of the small diameter portion 222*b* of the fastening hole 222 provided in the brake disc 20. In other words, the opening area of the through hole 311 is larger than the opening area of the small diameter portion 222*b*. Therefore, the peripheral edge of the through hole 311 is disposed on the outer circumferential side of the peripheral edge of the small diameter portion 222*b*. A difference between the length L of the through hole 311 and the diameter $D_{BS}$ of the small diameter portion 222*b* is preferably 6.0 mm or more ($L-D_{BS} \geq 6.0$ mm). The diameter $D_{BS}$ of the small diameter portion 222*b* is smaller than a diameter $D_W$ of the fastening hole 12 provided in the rotary member 10.

Further, the length L of the through hole 311 is larger than the diameter $D_W$ of the fastening hole 12 in the rotary member 10. In other words, the opening area of the through hole 311 is larger than the opening area of the fastening hole 12. Therefore, the peripheral edge of the through hole 311 is disposed on the outer circumferential side of the peripheral edge of the fastening hole 12. A difference between the length L of the through hole 311 and the diameter $D_w$ of the fastening hole 12 is preferably more than 4.0 mm ($L-D_w>4.0$ mm). That is, a distance d between the peripheral edge of the through hole 311 and the peripheral edge of the fastening hole 12 is preferably more than 2.0 mm.

Although not particularly limited, the length L of the through hole 311 is, for example, more than 18.5 mm and less than 47.0 mm. The length L is preferably 24.5 mm or more, and is more preferably more than 26.0 mm. The length L is preferably less than 44.0 mm, and more preferably less than 43.0 mm.

[Advantageous Effect]

In the disc brake device 100 according to the present embodiment, each protruding portion 32 of the control member 30 is disposed between the fins 22 disposed adjacent to each other in the circumferential direction. With such a configuration, the cross-sectional area of each ventilation passage defined by the rotary member 10, the fins 22, and the disc body 21 is partially reduced. Accordingly, the airflow rate in the ventilation passage can be limited and hence, it is possible to reduce aerodynamic sound generated during traveling of the railway vehicle.

In the disc brake device 100 according to the present embodiment, the base plate 31 of the control member 30 is provided with the through holes 311 through each of which the shaft portion 42 of the fastening member 40 is inserted. The peripheral edge of each through hole 311 is disposed on the outer circumferential side of the peripheral edge of each small diameter portion 222*b* of the fastening hole 222 provided in the brake disc 20. That is, the peripheral edge of the through hole 311 is disposed farther away from the shaft portion 42 of the fastening member 40 compared with the peripheral edge of the small diameter portion 222*b*. Therefore, it is possible to prevent the shaft portion 42 of the fastening member 40 from interfering with the peripheral edge of the through hole 311 when the fastening member 40 is moved with thermal expansion of the brake disc 20 during braking. Accordingly, it is possible to reduce a load on the control member 30.

In the present embodiment, the peripheral edge of each through hole 311 in the control member 30 is disposed on the outer circumferential side of the peripheral edge of each fastening hole 12 provided in the rotary member 10. Therefore, a portion of the control member 30 in the vicinity of the through hole 311 is clamped between the substantial portion (the portion other than the fastening hole 12) of the rotary member 10 and the fin 22. With such a configuration, even when the bottom portion 224 of the fastening hole 222 in the brake disc 20 receives a load from the head portion 41 of the fastening member 40 via the belleville washer 60 during braking, for example, the portion of the control member 30 in the vicinity of the through hole 311 is supported by the substantial portion of the rotary member 10, thus being less likely to fall into the fastening hole 12. Accordingly, it is possible to reduce displacement of the control member 30 in the axial direction.

In the present embodiment, the distance d between the peripheral edge of the through hole 311 in the control member 30 and the peripheral edge of the fastening hole 12 is preferably more than 2.0 mm. With such a configuration, it is possible to more surely suppress a situation in which a portion of the control member 30 in the vicinity of the through hole 311 falls into the fastening hole 12 in the rotary member 10.

In the present embodiment, the width W of the through hole 311 in the control member 30 is smaller than the maximum width $W_F$ of the top surface 221 of the fin 22. With such a configuration, it is possible to suppress occurrence of deformation in which the fin 22 falls into the through hole 311 in the control member 30.

The embodiment according to the present disclosure has been described heretofore. However, the present disclosure is not limited to the above-mentioned embodiment, and various modifications are conceivable without departing from the gist of the present disclosure.

For example, in the above-mentioned embodiment, each protruding portion 32 of the control member 30 is disposed in the vicinity of the radial center of the disc body 21. However, the position of the protruding portion 32 is not limited to the above. The protruding portion 32 may be disposed at a position close to the outer circumference of the disc body 21, or may be disposed at a position close to the inner circumference of the disc body 21.

In the above-mentioned embodiment, the base plate 31 of the control member 30 substantially has an annular plate shape. However, the base plate 31 may be divided into a plurality of parts in the circumferential direction. That is, the base plate 31 may be formed by a plurality of arc-shaped parts. Between the rotary member 10 and the brake disc 20, these arc-shaped parts are arranged in the circumferential direction either in contact with or in a spaced apart manner from each other. It is preferable that each arc-shaped part includes the plurality of protruding portions 32.

EXAMPLE

Hereinafter, the present disclosure will be described in more detail with reference to an example. However, the present disclosure is not limited to the following example.

To check the appropriate size of the through hole 311 provided in the base plate 31 of the control member 30, numerical value analysis was performed by the finite element method by using conventional analysis software (ABAQUS, Version 6.14-3, made by Dassault Systemes) while the minimum diameter length (diameter) L of the through hole 311 was changed.

In the analysis, by taking into account symmetry in the circumferential direction, a 15° region of the disc brake device 100 including the rotary member (wheel) 10, the brake discs 20, the control members 30, the fastening member 40, and the belleville washers 60 was modeled. An elastoplastic body was used as the material for the brake disc 20, elastic bodies were used as the materials for other components, and data measured in advance in an experiment were given as material physical property values. However, material physical property values of general structure steel were used for the control member 30.

Main dimension conditions of the analysis model are as follows.

Inner diameter of brake disc: 466.0 mm

Outer diameter of brake disc: 720.0 mm

Total thickness of brake disc: 43.5 mm

Thickness of disc body: 22.0 mm

The analysis was performed under earthquake detection brake conditions, being the most severe conditions. That is, assuming the case in which a stop brake was applied during traveling of the railway vehicle at 360 km/h, contact between the control member 30 and the fastening member 40, and displacement of the control member 30 in the axial direction were evaluated for each diameter L of a through hole 311 in the control member 30. Table 1 shows the diameter L of the through hole 311 in the control member 30 of each analysis model.

TABLE 1

| | Brake disc | | Wheel | Control member |
|---|---|---|---|---|
| No. | Diameter $D_{BS}$ [mm] of fastening hole | Width $W_F$ [mm] of fin | Diameter $D_W$ [mm] of fastening hole | Diameter L [mm] of through hole |
| 1 | 18.5 | 47.0 | 22.0 | 18.5 |
| 2 | | | | 22.0 |
| 3 | | | | 38.0 |
| 4 | | | | 47.0 |

In the case in which the diameter L of the through hole 311 in the control member 30 is equal to the diameter $D_{BS}$ of the small diameter portion 222*b* of the fastening hole 222 in the brake disc 20 (Table 1: No. 1), the shaft portion 42 of the fastening member 40 was brought into contact with the control member 30 during braking, thus generating an excessive stress in the control member 30. In contrast, in the case in which the diameter L is greater than the diameter $D_{BS}$ (Table 1: No. 2 to 4), contact between the control member 30 and the shaft portion 42 of the fastening member 40 did not occur during braking. Accordingly, it can be said that by setting $L>D_{BS}$ to cause the peripheral edge of the through hole 311 to be disposed on the outer circumferential side of the peripheral edge of the small diameter portion 222*b* of the fastening hole 222, it is possible to avoid contact between the control member 30 and the shaft portion 42 of the fastening member 40, so that a load on the control member 30 can be reduced.

To more surely avoid contact between the control member 30 and the shaft portion 42 of the fastening member 40, it is necessary to take into account the amount of movement of the brake disc 20 and the fastening member 40 in the radial direction during braking. In the analysis, after 73.6 seconds from the start of braking, an amount of movement of 2.9 mm in the radial direction was observed. From this result, it is preferable that the peripheral edge of the through hole 311 is away from the peripheral edge of the small diameter portion 222*b* by 3.0 mm or more. That is, a difference between the diameter L of the through hole 311 and the diameter $D_{BS}$ of the small diameter portion 222*b* is preferably 6.0 mm or more ($L-D_{BS}\geq 6.0$ mm).

Figure 5:
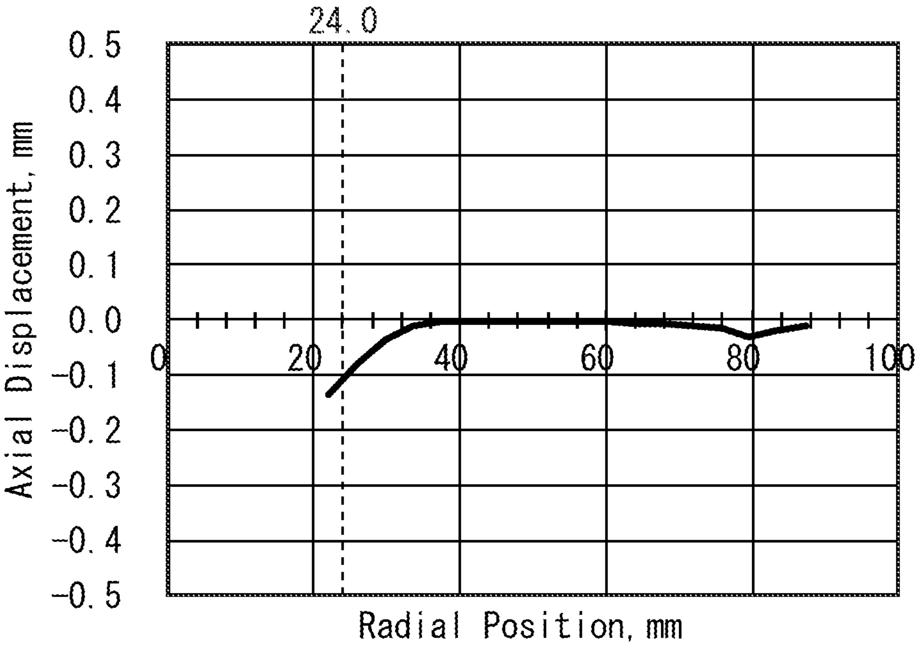
FIG. 5 is a graph showing the relationship between radial position and axial displacement during braking of a control member according to one example.
Figure 6:
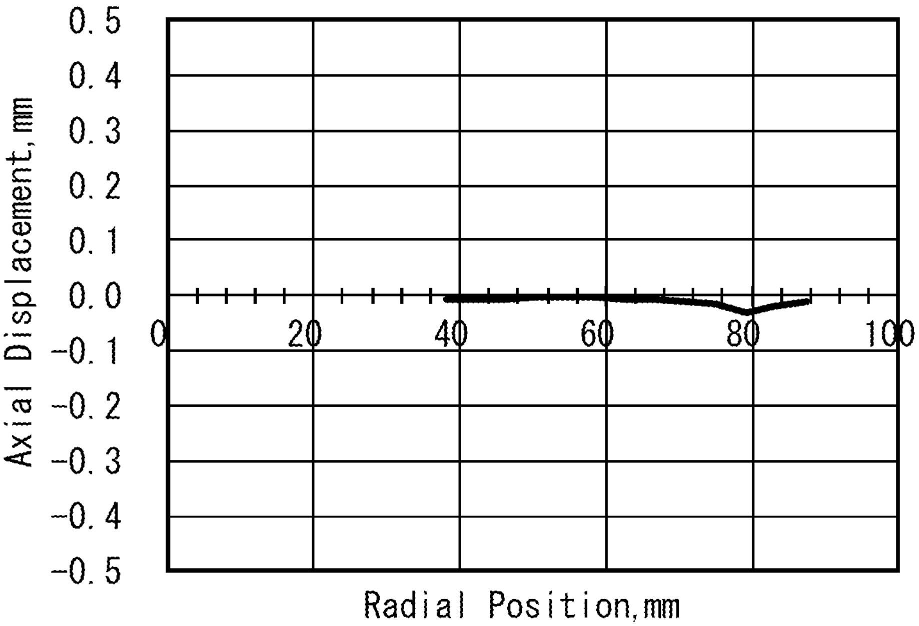
FIG. 6 is a graph showing the relationship between radial position and axial displacement during braking of a control member according to another example.
Figure 7:
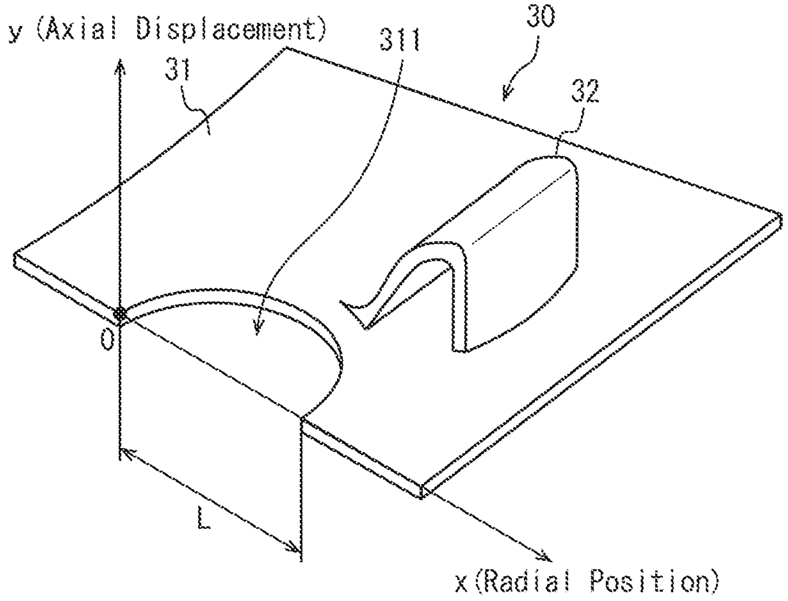
FIG. 7 is a perspective view schematically showing a control member of an analysis model used in each example.

FIG. 5 is a graph showing the relationship between radial position and axial displacement during braking of the control member 30 for No. 2 in Table 1, and FIG. 6 is a graph showing the relationship between radial position and axial displacement during braking of the control member 30 for No. 3 in Table 1. Regarding the radial position, as shown in FIG. 7, the inner end of the through hole 311 in the radial direction was used as the origin point (x=0), and the outward radial direction was assumed as a positive direction. In FIG. 5 and FIG. 6, axial displacement toward the rotary member 10 was assumed as displacement in the negative direction, axial displacement toward the brake disc 20 was assumed as displacement in the positive direction, and the minimum value of the position in the same radial direction (the value of a point displaced the most in the negative direction) was plotted.

As shown in FIG. 5, in the case in which the diameter L of the through hole 311 in the control member 30 is equal to the diameter $D_W$ of the fastening hole 12 in the rotary member 10 (Table 1: No. 2), the control member 30 is significantly displaced in the axial direction at the position of x=22.0 mm. However, when "x" is more than 24.0 mm, axial displacement (absolute value) of the control member 30 was 0.1 mm or less. In contrast, as shown in FIG. 6, in the case in which the diameter L is greater than the diameter $D_W$ (Table 1: No. 3), almost no axial displacement of the control member 30 occurred. However, in the case in which the diameter L (=the width W) of the through hole 311 is equal to the maximum width $W_F$ of the top surface 221 of the fin 22 (Table 1: No. 4), deformation occurred in which the fin 22 falls into the through hole 311.

From this result, it can be said that by setting $L>D_W$ to cause the peripheral edge of the through hole 311 to be disposed on the outer circumferential side of the peripheral edge of the fastening hole 12, it is possible to suppress axial displacement of the control member 30. Particularly, in the case in which the distance d from the peripheral edge of the fastening hole 12 to the peripheral edge of the through hole 311 is more than 2.0 mm, it is possible to more surely suppress axial displacement of the control member 30.

When the width W of the through hole 311 is set to be smaller than the maximum width $W_F$ of the top surface 221 of the fin 22 ($W_F>W$), it is possible to suppress deformation in which the fin 22 falls into the through hole 311. To more surely suppress the deformation, by taking into account the amount of movement of the brake disc 20 in the radial direction during braking, it is preferable to set $W_F-W>3.0$ mm, and it is more preferable to set $W_F-W>4.0$ mm.

REFERENCE SIGNS LIST

100: disc brake device
10: rotary member
12: fastening hole
20: brake disc
21: disc body
212: rear surface
22: fin
221: top surface
222: fastening hole
222*a*: large diameter portion
222*b*: small diameter portion
30: control member

31: base plate
311: through hole
32: protruding portion
40: fastening member
41: head portion
42: shaft portion

The invention claimed is:

1. A disc brake device for a railway vehicle, the disc brake device comprising:

a rotary member to be attached to an axle of the railway vehicle;

a brake disc including a disc body having an annular shape and a plurality of fins, the disc body having a rear surface that faces the rotary member, the plurality of fins being disposed on the rear surface in a radial shape;

a control member including a base plate and a protruding portion, the base plate being sandwiched between the rotary member and the plurality of fins, the protruding portion protruding from the base plate toward the disc body, and being positioned between, among the plurality of fins, fins disposed adjacent to each other in a circumferential direction of the brake disc, the control member being configured to control an airflow rate between the fins disposed adjacent to each other; and a fastening member configured to fasten the brake disc and the control member to the rotary member, wherein at least one of the plurality of fins has a first fastening hole including a large diameter portion and a small diameter portion, a head portion of the fastening member being disposed in the large diameter portion, the small diameter portion having a diameter smaller than a diameter of the large diameter portion, a shaft portion of the fastening member being inserted through the small diameter portion, the base plate has a through hole that is provided corresponding to the first fastening hole and through which the shaft portion is inserted, and a peripheral edge of the through hole is entirely axially disposed between the rotary member and the brake disc, and has a larger diameter than the diameter of the small diameter portion of the first fastening hole.

2. The disc brake device according to claim 1, wherein the rotary member has a second fastening hole that is provided corresponding to the first fastening hole and the through hole, and through which the shaft portion is inserted, and the peripheral edge of the through hole is disposed on an outer circumferential side of a peripheral edge of the second fastening hole.

3. The disc brake device according to claim 2, wherein a distance between the peripheral edge of the through hole and the peripheral edge of the second fastening hole is more than 2.0 mm.

4. The disc brake device according to claim 1, wherein a width of the through hole in the circumferential direction is smaller than a maximum width of a top surface of the fin having the first fastening hole.

5. The disc brake device according to claim 2, wherein a width of the through hole in the circumferential direction is smaller than a maximum width of a top surface of the fin having the first fastening hole.

6. The disc brake device according to claim 3, wherein a width of the through hole in the circumferential direction is smaller than a maximum width of a top surface of the fin having the first fastening hole.

* * * * *